(12) United States Patent
You et al.

(10) Patent No.: US 12,069,119 B2
(45) Date of Patent: Aug. 20, 2024

(54) DYNAMIC MULTIPLE ENDPOINT GENERATION

(71) Applicant: NOKIA TECHNOLOGIES OY, Espoo (FI)

(72) Inventors: Yu You, Kangasala (FI); Wolfgang Van Raemdonck, Antwerp (BE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/256,831

(22) PCT Filed: Jul. 10, 2019

(86) PCT No.: PCT/US2019/041221
§ 371 (c)(1),
(2) Date: Dec. 29, 2020

(87) PCT Pub. No.: WO2020/014372
PCT Pub. Date: Jan. 16, 2020

(65) Prior Publication Data
US 2021/0289015 A1    Sep. 16, 2021

Related U.S. Application Data

(60) Provisional application No. 62/696,150, filed on Jul. 10, 2018.

(51) Int. Cl.
*H04L 65/75* (2022.01)
*H04L 41/12* (2022.01)
(Continued)

(52) U.S. Cl.
CPC ............ *H04L 65/75* (2022.05); *H04L 41/12* (2013.01); *H04L 65/1073* (2013.01); *H04L 65/612* (2022.05); *H04L 65/80* (2013.01)

(58) Field of Classification Search
CPC .............. H04L 67/101; H04L 67/1002; H04L 65/4084; H04L 67/1025; H04L 29/06;
(Continued)

(56) References Cited

U.S. PATENT DOCUMENTS 8,892,708 B2* 11/2014 Merrill ............... H04L 41/5041
709/223
2001/0025378 A1* 9/2001 Sakamoto .......... H04N 21/2396
725/114
(Continued)

FOREIGN PATENT DOCUMENTS

CN     101523371 A     9/2009
CN     102577309 A     7/2012
(Continued)

OTHER PUBLICATIONS

International Search Report and Written Opinion dated Oct. 17, 2019 corresponding to International Patent Application No. PCT/US2019/041221.

(Continued)

*Primary Examiner* — Tonia L Dollinger
*Assistant Examiner* — Mehulkumar J Shah
(74) *Attorney, Agent, or Firm* — Barta Jones, PLLC

(57) ABSTRACT

Methods and apparatuses are provided to improve streaming of data by providing efficient media ingress and egress. A method may include sending a plurality of stream registration requests for streams to stream data. The method may also include receiving a plurality of stream addresses. The method may further include establishing a plurality of data links with the plurality of transmission endpoints, and establishing a new data link with a new transmission endpoint according to changing conditions affecting a user equipment, while preserving the same data streams for streaming the data.

22 Claims, 12 Drawing Sheets

(51) Int. Cl.
*H04L 65/1073* (2022.01)
*H04L 65/612* (2022.01)
*H04L 65/80* (2022.01)

(58) Field of Classification Search
CPC ....... H04L 29/08; H04L 65/601; H04L 41/12; H04L 65/1073; H04L 65/80; H04L 12/24; H04L 65/75; H04L 65/612; H04L 67/1001; G06F 8/60; G06F 9/44505; G06F 9/455
USPC ........................................................ 709/231
See application file for complete search history.

(56) References Cited

U.S. PATENT DOCUMENTS

| | | | | |
|---|---|---|---|---|
| 2005/0283536 | A1* | 12/2005 | Swanson | G06Q 10/10 709/204 |
| 2010/0049628 | A1* | 2/2010 | Mannava | G06Q 30/0601 705/26.1 |
| 2013/0018999 | A1* | 1/2013 | Merrill | H04L 41/5041 709/223 |
| 2013/0163505 | A1* | 6/2013 | Lysejko | H04W 40/22 370/315 |
| 2014/0267570 | A1* | 9/2014 | Weber | H04N 7/15 348/14.08 |
| 2015/0088972 | A1* | 3/2015 | Brand | H04L 67/52 709/203 |
| 2016/0330667 | A1* | 11/2016 | Surmay | H04W 36/18 |
| 2017/0013065 | A1* | 1/2017 | Ho | H04L 69/40 |
| 2017/0264665 | A1* | 9/2017 | Stevens | H04L 65/607 |
| 2017/0280363 | A1* | 9/2017 | Tenny | H04W 36/0069 |
| 2019/0150150 | A1* | 5/2019 | Calin | H04W 72/0453 370/329 |

FOREIGN PATENT DOCUMENTS

| | | |
|---|---|---|
| CN | 107426145 A | 12/2017 |
| CN | 108134715 A | 6/2018 |
| EP | 2 852 125 A1 | 3/2015 |

OTHER PUBLICATIONS

T. Bray, Ed., "The JavaScript Object Notation (JSON) Data Interchange Format", Internet Engineering Task Force (IETF) Request for Comments: 8259 Obsoletes: 7159 Category: Standards Track ISSN: 2070-1721, RFC 8259—The JavaScript Object Notation (JSON) Data Interchange Format, Dec. 2017, 17 pages, https://tools.ietf.org/html/rfc8259.

Reactivex, "An API for asynchronous programming with observable streams", 5 pages, http://reactivex.io/.

Kyungmo Park et al., "International Organisation for Standardisation Organisation Internationale de Normalisation ISO/IEC JTC1/SC29/WG11 Coding of Moving Pictures and Audio", ISO/IEC JTC1/SC29/WG11 MPEG2018/N17502, Apr. 2018, San Diego, US, 25 pages.

JSON Schema, The home of JSON Schema, 3 pages, http://json-schema.org.

Indian Office Action issued in corresponding Indian Patent Application No. 202147005018 on Jan. 10, 2022.

Chinese Office Action issued in corresponding Chinese Patent Application No. 201980059263.0 on Sep. 20, 2022.

Chinese Office Action issued in corresponding Chinese Patent Application No. 201980059263.0 on Apr. 23, 2023.

* cited by examiner

| Protocol | Sample Endpoint (URL and operations) |
|---|---|
| AMQP | {"key": "KEY",<br>"exchange": "EXCHANGE",<br>"url":<br>"amqp://USERNAME:PASSWORD@IP:PORT/%2Ftest"} |
| HTTP(REST) | {"path": "PATH", "verb": "POST", "url":<br>"http://USERNAME:PASSWORD@IP:PORT"} |
| Kafka | {"topic": "TOPIC",<br>"url": "kafka://IP :PORT"} |
| WebRTC | {"path": "PATH",<br>"url": "http ://IP:PORT/janus"} |
| RTMP | {"path": "PATH",<br>"url": "rtmp://IP:PORT/bridge"} |

FIG. 5

```
1.  {
2.      "$schema": "http://json-schema.org/latest/json-schema-validation.html",
3.      "id": "http://yourdomain.com/schemas/stream_schema.json",
4.      "definitions": {
5.          "streams": {
6.              "type": "array",
7.              "items": {
8.                  "$ref": "#/definitions/stream"
9.              }
10.         },
11.         "stream": {
12.             "type": "object",
13.             "properties": {
14.                 "version": {
15.                     "type": "string",
16.                     "description": "version according semver.org"
17.                 },
18.                 "name": {
19.                     "type": "string",
20.                     "description": "A human-friendly reference that uniquely identifies a stream, together with the namespace "
21.                 },
22.                 "namespace": {
23.                     "type": "string",
24.                     "description": "A prefix string to facilitate grouping of streams. Namespaces are delimited by the slash ('/') character"
25.                 },
26.                 "streamType": {
27.                     "type": "string",
28.                     "description": "Source or sink stream type",
29.                     "enum": [
30.                         "source",
31.                         "sink"
32.                     ]
33.                 },
34.                 "schema": {
35.                     "type": "object",
36.                     "description": "Stream data schema"
37.                 },
38.                 "protocol": {
39.                     "type": "string",
```

FIG. 6A

```
46.             "description": "A string represents the transport protocol used for publishing (or consuming) data to (or from) the system"
41.           },
42.           "tags": {
43.             "type": "array",
44.             "description": "Tags are used for search and discovery purposes, where multiple streams from the same tag are expected",
45.             "minItems": 0,
46.             "items": {
47.               "type": "string"
48.             }
49.           }
50.         }
51.       }
52.     },
53.   "title": "Stream schema",
54.   "description": "Stream schema",
55.   "type": "object",
56.   "properties": {
57.     "streams": {
58.       "type": "array",
59.       "items": {
60.         "$ref": "#/definitions/stream"
61.       }
62.     }
63.   },
64.   "required": [
65.     "streams"
66.   ]
67. }
```

FIG. 6B

```
1.  {
2.      "streams": [
3.          {
4.              "version": "1.0.0-alpha"J
5.              "name": " temperature ",
6.              "namespace": "sensor001",
7.              "streamType": "source",
8.              "streamSchema": {
9.                  "format": "json",
10.                 "schema": {
11.                     "type": "object",
12.                     "properties": {
13.                         "measurement": {
14.                             "type": "number",
15.                             "default": 20
16.                         }
17.                     }
18.                 }
19.             },
20.             "protocol": "https",
21.             "tags": [
22.                 "sensor",
23.                 "temperature"
24.             ]
25.         }
26.     ]
27. }
```

FIG. 7

```
{
  "description": "NBMP stream demo",
  "id": "09910b10-6fbe-11e8-b805-0242ac14000d",
  "name": "nbmp/temperature",
  "stream_type_id": "temperature",
  "tags": [
    "sensor",
    "temperature"
  ],
  "version": 1,
  "protocol": "https",
  "endpoint": {
    "path": "/data/ingress/nbmp%2Ftemperature2",
    "verb": "POST",
    "url": "https://USERNAME:PASSWD@ENDPOINT_IP:PORT"
  }
}
```

FIG. 8

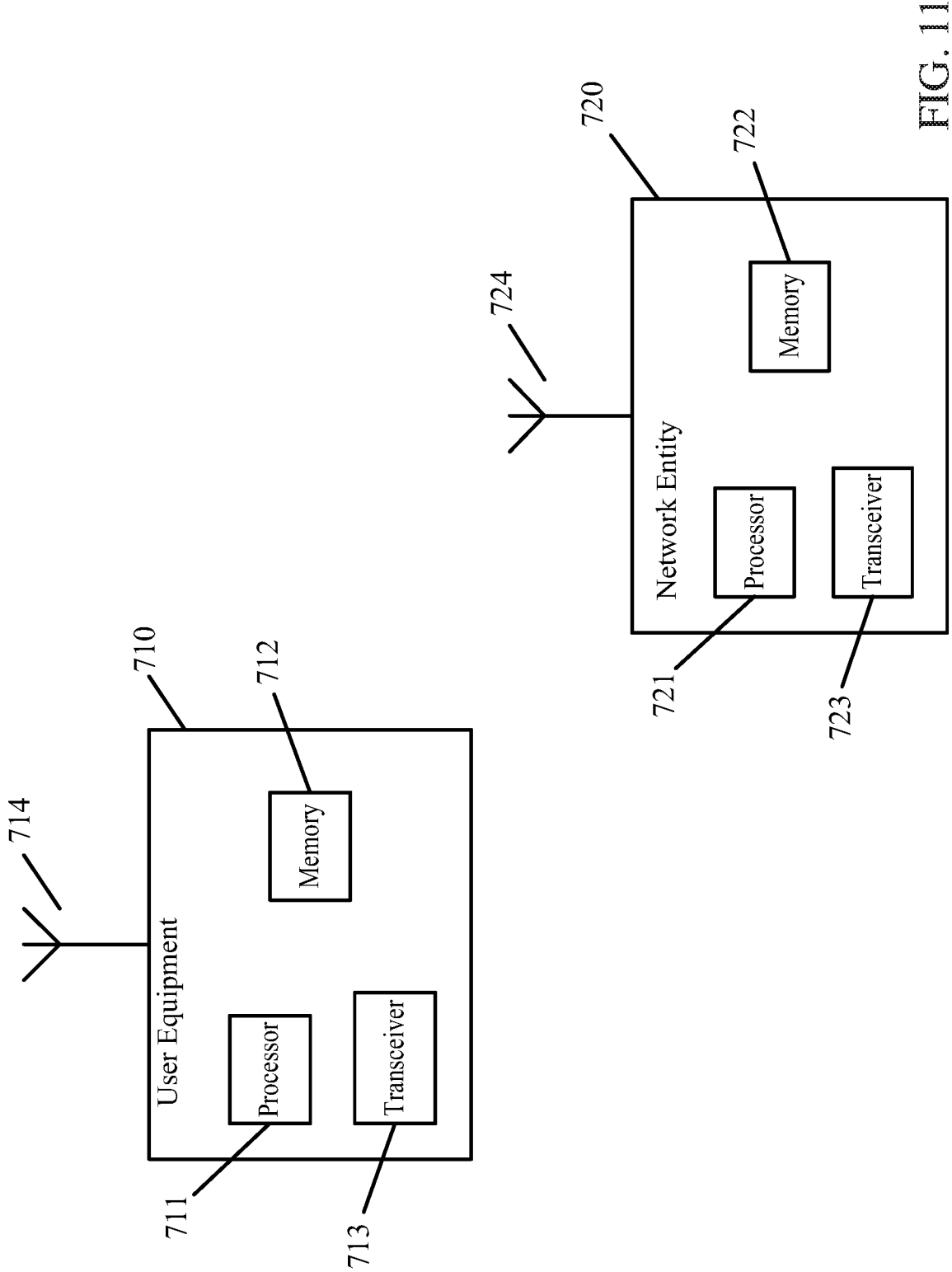

DYNAMIC MULTIPLE ENDPOINT GENERATION

CROSS-REFERENCE TO RELATED APPLICATIONS

This application claims the benefit of U.S. provisional patent application No. 62/696,150 filed on Jul. 10, 2018. The contents of this earlier filed application are hereby incorporated by reference in their entirety.

FIELD

Various communication systems may benefit from improved streaming of data. Therefore, certain example embodiments may relate to improving data streaming by providing multiple dynamic endpoints for efficient data ingress and egress.

BACKGROUND

Recent third generation partnership project (3GPP) technology developments have focused on fifth generation (5G), new radio (NR) technology, such as live media data ingestion and consumption for 5G multi-access edge computing (MEC) in 5G MEC environments. Redundant multiple live endpoints for receiving and publishing streamed data may be used to support failover and scalability. A typical streaming system may work with unbound ingested data over a transport protocol from the producers, and may continuously output the processed data over the same or different protocols to consumers. The endpoints for ingestion and egestion may be provided by a platform statically with a fixed address and a protocol support, independent to the producers and consumers.

Conventional Internet of Things (IoT) or big data analytic engines may operate based on an architecture where all the data to be analyzed may first be transported over the network into a centralized information technology (IT) cloud, such as a data center. The data may be stored on a distributed file system for analysis. Although this setup may work for low to medium-volume data streams and non-latency-critical applications, it may become expensive in terms of bandwidth and storage for media streams, and may incur significant latency for data streams. Thus, there are challenges in being able to enable a distributed stream processing infrastructure to coordinate dynamic nodes for data communication in edge environments in an elastic, scalable, but manageable way.

SUMMARY

In accordance with some example embodiments, a method may include sending, to a server, a plurality of stream registration requests for streams to stream data. The method may also include receiving, from the server, a plurality of stream addresses for a plurality of transmission endpoints, and a plurality of protocol-parameters for the plurality of transmission endpoints. The method may further include, with the plurality of stream addresses, establishing a plurality of data links with the plurality of transmission endpoints. In addition, the method may include establishing a new data link with a new transmission endpoint according to changing conditions affecting a user equipment and the transmission endpoints, while preserving the same data streams for streaming the data.

In accordance with some example embodiments, an apparatus may include means for sending, to a server, a plurality of stream registration requests for streams to stream data. The apparatus may also include means for receiving, from the server, a plurality of stream addresses for a plurality of transmission endpoints, and a plurality of protocol-parameters for the plurality of transmission endpoints. The apparatus may further include means for, with the plurality of stream addresses, establishing a plurality of data links with the plurality of transmission endpoints. In addition, the apparatus may include means for establishing a new data link with a new transmission endpoint according to changing conditions affecting a user equipment and the transmission endpoints, while preserving the same data streams for streaming the data.

In accordance with some example embodiments, an apparatus may include at least one processor and at least one memory including computer program code. The at least one memory and the computer program code may be configured to, with the at least one processor, cause the apparatus at least to send, to a server, a plurality of stream registration requests for streams to stream data. The apparatus may also be caused to receive, from the server, a plurality of stream addresses for a plurality of transmission endpoints, and a plurality of protocol-parameters for the plurality of transmission endpoints. The apparatus may further be caused to, with the plurality of stream addresses, establish a plurality of data links with the plurality of transmission endpoints. In addition, the apparatus may be caused to establish a new data link with a new transmission endpoint according to changing conditions affecting a user equipment and the transmission endpoints, while preserving the same data streams for streaming the data.

In accordance with some example embodiments, a non-transitory computer readable medium can be encoded with instructions that may, when executed in hardware, perform a method. The method may include sending, to a server, a plurality of stream registration requests for streams to stream data. The method may also include sending, to a server, a plurality of stream registration requests for streams to stream data. The method may also include receiving, from the server, a plurality of stream addresses for a plurality of transmission endpoints, and a plurality of protocol-parameters for the plurality of transmission endpoints. The method may further include, with the plurality of stream addresses, establishing a plurality of data links with the plurality of transmission endpoints. In addition, the method may include establishing a new data link with a new transmission endpoint according to changing conditions affecting a user equipment and the transmission endpoints, while preserving the same data streams for streaming the data.

In accordance with some example embodiments, a computer program product may perform a method. The method may include sending, to a server, a plurality of stream registration requests for streams to stream data. The method may also include sending, to a server, a plurality of stream registration requests for streams to stream data. The method may also include receiving, from the server, a plurality of stream addresses for a plurality of transmission endpoints, and a plurality of protocol-parameters for the plurality of transmission endpoints. The method may further include, with the plurality of stream addresses, establishing a plurality of data links with the plurality of transmission endpoints. In addition, the method may include establishing a new data link with a new transmission endpoint according to changing conditions affecting a user equipment and the transmission endpoints, while preserving the same data streams for streaming the data.

In accordance with some example embodiments, an apparatus may include circuitry configured to send, to a server, a plurality of stream registration requests for streams to stream data. The apparatus may also include circuitry configured to receive, from the server, a plurality of stream addresses for a plurality of transmission endpoints, and a plurality of protocol-parameters for the plurality of transmission endpoints. The apparatus may further include circuitry configured to, with the plurality of stream addresses, establish a plurality of data links with the plurality of transmission endpoints. In addition, the apparatus may include circuitry configured to establish a new data link with a new transmission endpoint according to changing conditions affecting a user equipment and the transmission endpoints, while preserving the same data streams for streaming the data.

In accordance with some example embodiments, a method may include receiving, from a user equipment, a plurality of stream registration requests for streams to stream data. The method may also include, in response to the plurality of stream registration requests, generating a plurality of transmission endpoints for streaming the data. The method may further include, after the plurality of transmission endpoints are generated, sending a plurality of stream addresses and a plurality of protocol-specific parameters for the plurality of transmission endpoints. The method may also include triggering the user equipment to establish a plurality of data links with the plurality of transmission endpoints according to the plurality of stream addresses and the plurality of protocol-specific parameters. The method may further include generating a new transmission endpoint according to changing conditions affecting the user equipment and the transmission endpoints, while preserving the same data streams for streaming the data.

In accordance with some example embodiments, an apparatus may include means for receiving, from a user equipment, a plurality of stream registration requests for streams to stream data. The apparatus may also include means for, in response to the plurality of stream registration requests, generating a plurality of transmission endpoints for streaming the data. The apparatus may further include means for, after the plurality of transmission endpoints are generated, sending a plurality of stream addresses and a plurality of protocol-specific parameters for the plurality of transmission endpoints. The apparatus may also include means for triggering the user equipment to establish a plurality of data links with the plurality of transmission endpoints according to the plurality of stream addresses and the plurality of protocol-specific parameters. The apparatus may further include means for generating a new transmission endpoint according to changing conditions affecting the user equipment and the transmission endpoints, while preserving the same data streams for streaming the data.

In accordance with some example embodiments, an apparatus may include at least one processor and at least one memory including computer program code. The at least one memory and the computer program code may be configured to, with the at least one processor, cause the apparatus at least to receive, from a user equipment, a plurality of stream registration requests for streams to stream data. The apparatus may also be caused to, in response to the plurality of stream registration requests, generate a plurality of transmission endpoints for streaming the data. The apparatus may further be caused to, after the plurality of transmission endpoints are generated, send a plurality of stream addresses and a plurality of protocol-specific parameters for the plurality of transmission endpoints. The apparatus may also be caused to trigger the user equipment to establish a plurality of data links with the plurality of transmission endpoints according to the plurality of stream addresses and the plurality of protocol-specific parameters. The apparatus may further be caused to generate a new transmission endpoint according to changing conditions affecting the user equipment and the transmission endpoints, while preserving the same data streams for streaming the data.

In accordance with some example embodiments, a non-transitory computer readable medium can be encoded with instructions that may, when executed in hardware, perform a method. The method may include receiving, from a user equipment, a plurality of stream registration requests for streams to stream data. The method may also include, in response to the plurality of stream registration requests, generating a plurality of transmission endpoints for streaming the data. The method may further include, after the plurality of transmission endpoints are generated, sending a plurality of stream addresses and a plurality of protocol-specific parameters for the plurality of transmission endpoints. The method may also include triggering the user equipment to establish a plurality of data links with the plurality of transmission endpoints according to the plurality of stream addresses and the plurality of protocol-specific parameters. The method may further include generating a new transmission endpoint according to changing conditions affecting the user equipment and the transmission endpoints, while preserving the same data streams for streaming the data.

In accordance with some example embodiments, a computer program product may perform a method. The method may include receiving, from a user equipment, a plurality of stream registration requests for streams to stream data. The method may also include, in response to the plurality of stream registration requests, generating a plurality of transmission endpoints for streaming the data. The method may further include, after the plurality of transmission endpoints are generated, sending a plurality of stream addresses and a plurality of protocol-specific parameters for the plurality of transmission endpoints. The method may also include triggering the user equipment to establish a plurality of data links with the plurality of transmission endpoints according to the plurality of stream addresses and the plurality of protocol-specific parameters. The method may further include generating a new transmission endpoint according to changing conditions affecting the user equipment and the transmission endpoints, while preserving the same data streams for streaming the data.

In accordance with some example embodiments, an apparatus may include circuitry configured to receive, from a user equipment, a plurality of stream registration requests for streams to stream data. The apparatus may also include circuitry configured to, in response to the plurality of stream registration requests, generate a plurality of transmission endpoints for streaming the data. The apparatus may further include circuitry configured to, after the plurality of transmission endpoints are generated, send a plurality of stream addresses and a plurality of protocol-specific parameters for the plurality of transmission endpoints. The apparatus may also include circuitry configured to trigger the user equipment to establish a plurality of data links with the plurality of transmission endpoints according to the plurality of stream addresses and the plurality of protocol-specific parameters. The apparatus may further include circuitry configured to generate a new transmission endpoint according to changing conditions affecting the user equipment and the transmission endpoints, while preserving the same data streams for streaming the data.

BRIEF DESCRIPTION OF THE DRAWINGS

For proper understanding of this disclosure, reference should be made to the accompanying drawings, wherein:

FIG. 5 illustrates sample transport protocols with corresponding endpoint parameters according to an example embodiment.

FIG. 6(A) illustrates a list of stream data according to an example embodiment.

FIG. 6(B) illustrates a continuation of the list of stream data in FIG. 6(A) according to an example embodiment.

FIG. 7 illustrates another list stream of data according to an example embodiment.

FIG. 8 illustrates a further list stream of data according to an example embodiment.

FIG. 11 illustrates a system according to an example embodiment.

DETAILED DESCRIPTION

Figure 1:
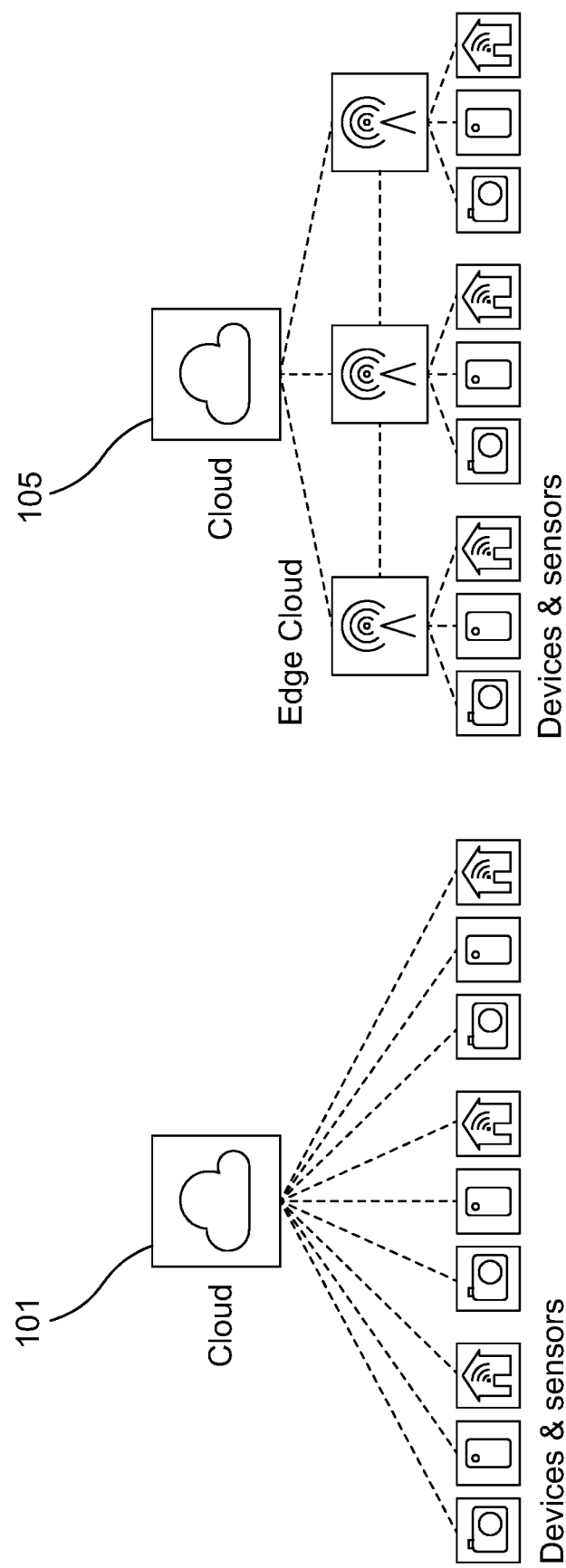
FIG. 1 illustrates a stream processing architectures according to an example embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products is not intended to limit the scope of certain examples but is representative of selected example embodiments.

The features, structures, or characteristics of certain examples described throughout this specification may be combined in any suitable manner in one or more embodiments. For example, the usage of the phrases "example embodiment," "some examples," "certain examples," or other similar language, throughout this specification refers to the fact that a particular feature, structure, or characteristic described in connection with the example may be included in at least one example, and is in no way meant to limit any of the above examples. Thus, appearance of the phrases "in certain examples," "in some examples," "in other examples," or other similar language, throughout this specification does not necessarily refer to the same group of examples, and the described features, structures, or characteristics may be combined in any suitable manner in one or more examples.

In certain examples, an endpoint may be a physical computing node with a publicly accessible network address, and at least one transport protocol associated with one type of data transmission. The publicly accessible network addresses may include an internet protocol (IP) address or a uniform resource identifier (URI), and at least one transport protocol associated with one type of data transmission. Further, multiple endpoints may be synchronized and support a graceful start and tear down. In addition, the endpoints may have low latency requirements, and may be placed at locations close to users. The endpoints may also be server uniform resource locators (URLs) which may include parameters such as path or channel information. For instance, the parameters may be protocol-specific.

According to certain examples, protocol specific parameters of the endpoints may be provided by the server as a response to a protocol negotiation. The protocol negotiation may be a mechanism to support creation of dynamic endpoints. Dynamic endpoints may be created based on various factors including, but not limited to a cost function. The cost function may take into account locations of data sources, both for upstream and downstream cases, and take into account any available firewall constraints on the client. In an example embodiment, the data sources may correspond to one or more user equipments (UEs). In another example embodiment, the dynamic endpoints may be created based on a network's topology, in which services may be deployed as close as possible to the client to lower latency and create a faster connection. In other example embodiments, the endpoint configuration may be affected by changes in the locations of the UE and network topology.

In certain example embodiments, the protocol negotiation may involve a client or user of a UE that initializes the negotiation by proposing multiple different transport requests for streaming data. The transport requests may include supplementary parameters such as locations of the UE for streaming, and streaming types. In an example embodiment, streaming types may include source stream types or sink stream types. In a source stream, data may be published via the endpoints that can be stored and processed in an IT Cloud. On the other hand, in a sink stream, data generated by processing functions in the cloud may be consumed through the endpoints.

According to an example embodiment, the multiple different transport requests for the streaming data may be received at a server. The server may read the requests and create one or more transmission service endpoints. The server may also store the requests in a system service registry. Once the endpoints have been created and become ready, the server may respond back to the client with physical addresses of the service endpoints, and provide protocol-specific communication parameters of the endpoints to the client. In an example embodiment, such parameters may be provided completely in the response from the server, and therefore the client does not need to have any prior knowledge about all of the protocol-specific parameters. Instead, the client may query for information about the protocol-specific parameters at the run-time, dynamically. Thus, according to certain example embodiments, different endpoints may be provided for the same data streams. That is, the server may open a plurality of endpoints with different and/or the same protocols for concurrent data ingress and egress. Further, in an example embodiment, real-time data federation and conversion for protocol payload may be done at the server. Moreover, each created endpoint may have multiple protocol support capabilities for data ingress and egress.

FIG. 1 illustrates stream processing architectures according to an example embodiment. In particular, the architectures 101 and 105 illustrated in FIG. 1 may relate to multi-access computing, or mobile edge computing (MEC) to provide a solution for introducing a multi-tier solution. As illustrated in FIG. 1, processing engines may be deployed in a decentralized architecture 101, as compared to a centralized information technology (IT) architecture 105. With a decentralized architecture, it may be possible to provide a solution to processing a large number of data and media streams generated by geographically distributed sources. In addition, as illustrated in FIG. 1, rather than the Cloud establishing data streams with various devices and sensors, under a decentralized architecture, multiple edge clouds such as network nodes including base stations and other edge nodes may be deployed to process and establish data streams with the devices and sensors. That is, the edge clouds may be positioned between the cloud and the devices and sensors at locations physically closer to the devices and sensors. According to such a configuration, it may be possible to offload some of the workload from the cloud at a location closer to the devices and sensors for processing while speeding up applications that may require a low latency response.

Figure 2:
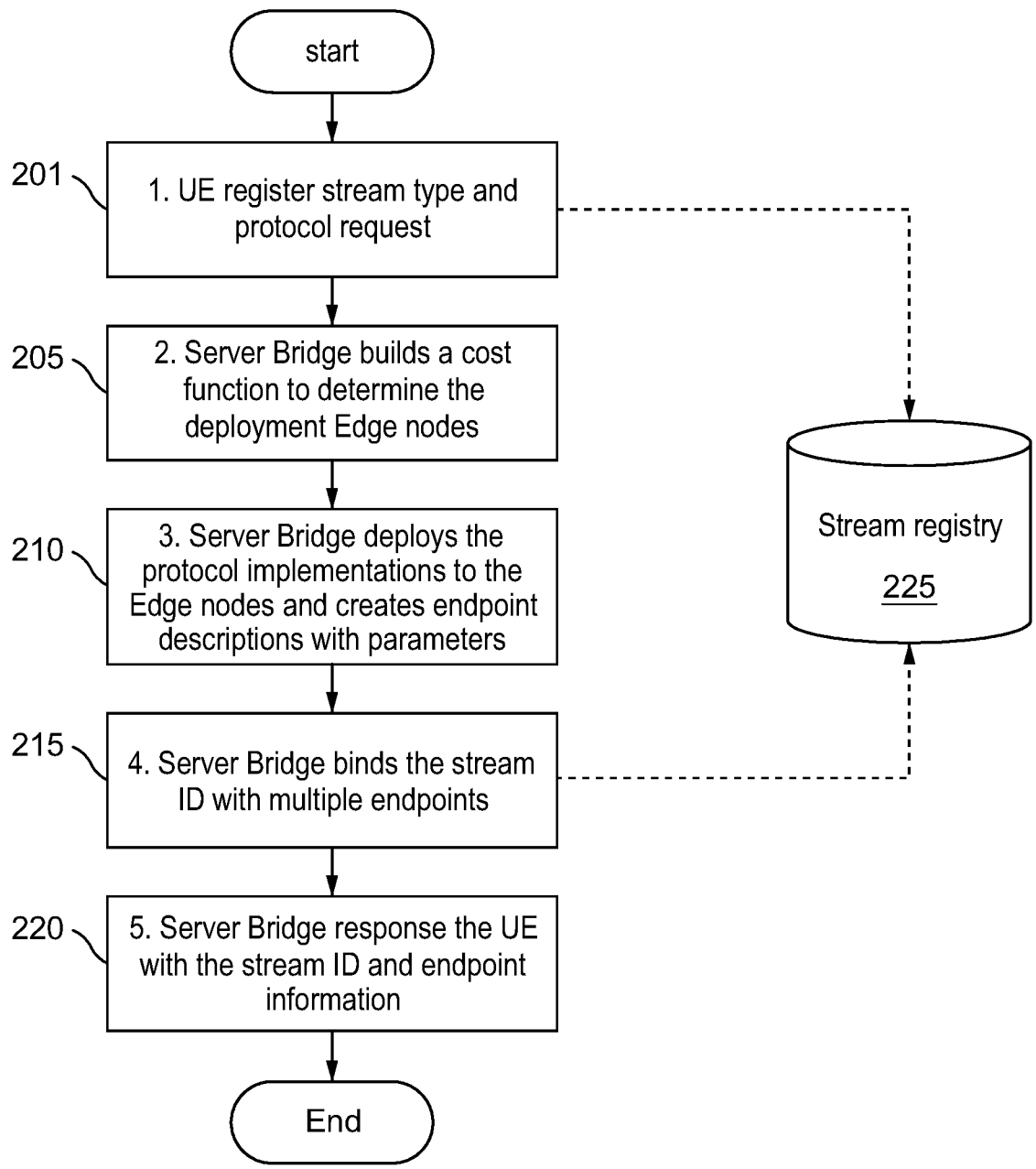
FIG. 2 illustrates a flow diagram according to an example embodiment.

FIG. 2 illustrates a flow diagram according to an example embodiment. In an endpoint creation process of certain example embodiments, a plurality of transport protocols may be available for transferring data between the UE and the Cloud. As illustrated in FIG. 2, a dynamic endpoint creation and migration mechanism, as well as streaming data (streams) for registration may be provided. In example embodiments, the server-end component may be referred to as a server bridge to represent an interface for the stream and endpoint management.

The example flow diagram illustrated in FIG. 2 may represent communications and interactions between a UE and server bridge to create endpoints for data streaming. In particular, at 201, the UE may send a stream registration request to the server bridge for data streaming. The stream registration request may indicate the UE's preferred protocol to publish or to consume data to or from a Cloud platform. In an example embodiment, the stream registration request may include certain requirements such as Quality of Service (QOS) and latency requirements. As further illustrated in FIG. 2, the stream registration request sent by the UE may be stored and recorded in a stream registry 225.

At 205, after receiving the stream registration request, the server bridge may register the stream requested by the UE, and build a cost function to determine the deployment of certain edge nodes and create the endpoints. In certain example embodiments, the cost function used for deployment decisions may be complementary to the server bridge. In addition, the cost function may be heuristic to keep processing local to the data. Alternatively, the cost function may implement a scheduler or placement algorithm that takes into account the complex graph of network connectivity and compute costs.

According to an example embodiment, the cost function may take into account the locations of the data sources, such as the UE, and may also take into account any available firewall constraints of the UE. Thus, in an example embodiment, the server bridge may query the locations of the UE. For instance, the server bridge may query the locations of the UE via 5G MEC Location Service. In doing so, the server bridge may read the stream data type and requirements from the UE, and notify a Cloud scheduler to schedule the deployment of the endpoints.

At 210, after determining the deployment of the edge nodes, the server bridge may deploy the protocol implementations to the edge nodes and create endpoint descriptions with the protocol-specific parameters. In addition, at 215, a stream identifier (ID) may be created to identify one or more streams for streaming data to the UE. In addition, the server bridge may bind the stream ID with multiple endpoints such that the stream ID also includes information identifying a specific endpoint for data ingress or egress. Further, at 215, the server bridge may register the stream ID with the stream registry 225, and the binding of the endpoints and the registered stream ID may be provided to storage in the Cloud.

At 220, the server bridge may return the registered stream ID with endpoint information to the UE so that the UE can establish data links with the endpoints. In an example embodiment, the endpoint information provided to the UE may include protocol-specific, stream specific, and ingress or egress endpoint information. After receiving the response from the server bridge, the UE may start publishing or consuming data via the newly created endpoints.

As previously noted, according to certain example embodiments, the endpoints may be created with different or the same protocols for concurrent data ingress and egress. For instance, multiple different physical endpoints other than the server address/host may be created with multiple protocol supports, and the data may be transferred over the same or different protocols from the endpoints. With such a mechanism, it may be possible to provide different endpoints for the same data streams. Moreover, since creation of the endpoints may take into account a cost function, the endpoints may be dynamic in that they may be as mobile as the UE. Such endpoint migration may take place over a period of time and be adaptive to the UE.

In other example embodiments, the endpoints may not be permanent, but may be changed upon the requests of the UEs, or managed automatically by the server bridge. For example, when an endpoint is managed by the server bridge in the Cloud, the changes that may be sent to the connected UEs may include a new endpoint addresses, or different transport parameters. The new endpoint may also support the same or different protocol the previous endpoint connected to the UE. Then, upon receiving the change request from the server bridge, the UEs may complete the endpoint migration by switching to the new endpoint. After switching to the new endpoint, the whole data streaming and processing may continue.

Figure 3:
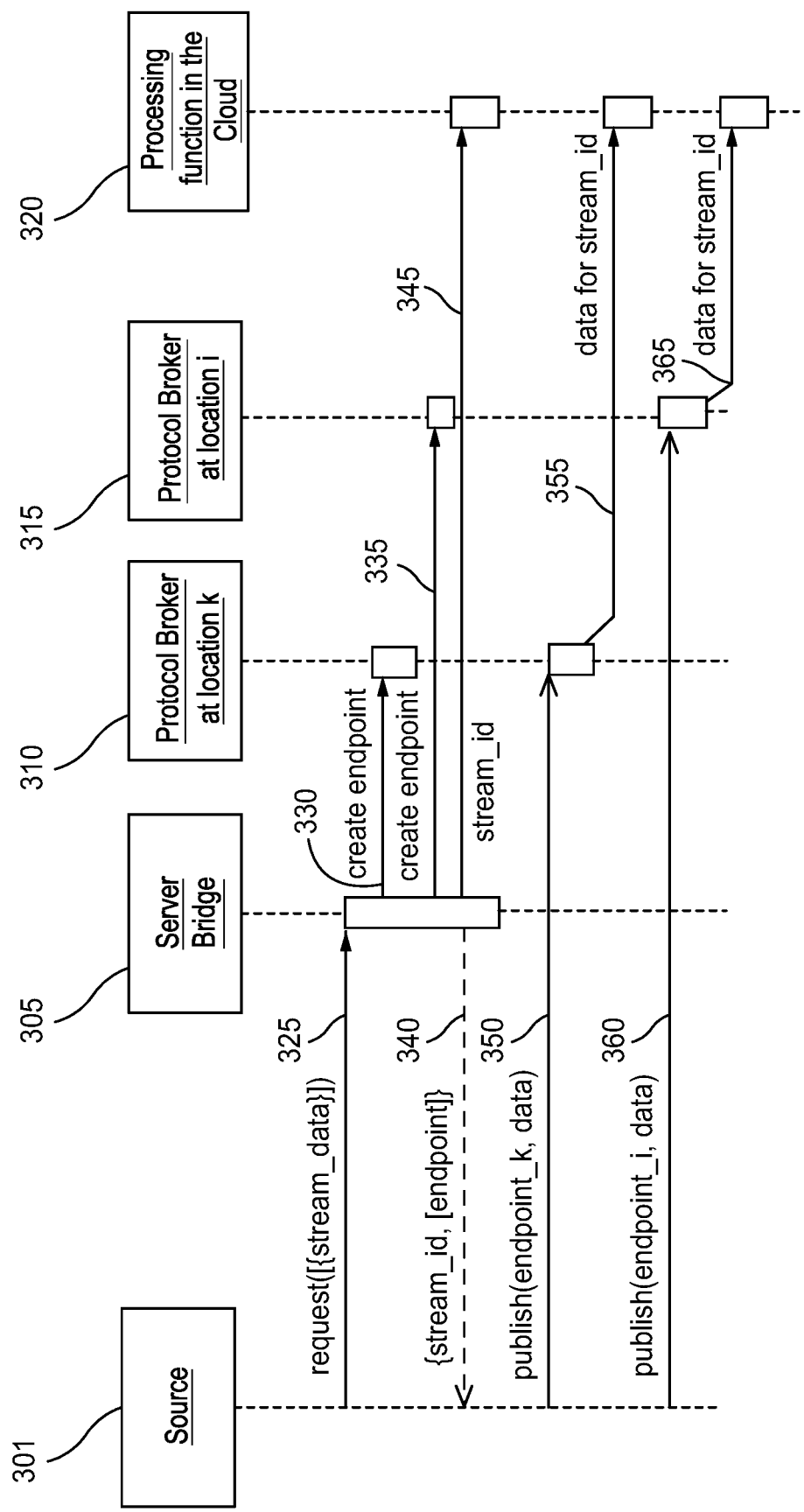
FIG. 3 illustrates a signal flow diagram according to an example embodiment.

FIG. 3 illustrates a signal flow diagram according to an example embodiment. In particular, the example signal flow diagram illustrated in FIG. 3 may relate to an upstream registration and endpoint creation procedure corresponding to a source stream. That is, as previously described, the source stream may publish data via the endpoints that can be stored and processed in the Cloud. Further, the example signal flow diagram illustrated in FIG. 3 may include a source 301, a server bridge 305, a protocol broker 310 at location a location k, a protocol broker 315 at a location i, and a processing function in the Cloud 320. In an example embodiment, the source 301 may be a data source or a UE, and the protocol brokers 310 and 315 may act as proxies between two communication nodes such as the source 301 and the processing function in the Cloud 320. Further, the communication may be direct and/or indirect and push and/or pull, respectively. As illustrated in FIG. 3, the protocol brokers 310 and 315 may also be locations where endpoints are created.

In an upstream registration and endpoint creation procedure, at 325, the source may send a request to the server bridge 305 for streaming data. After the request is received and in response to the request from the source 301, at 330, the server bridge may create an endpoint k at location k where protocol broker 310 is located. At 335, the server bridge 305, may also create an endpoint i at location i where protocol broker 315 is located. After creating the endpoints, the server bridge 305 may, at 340, provide the source 301 with a stream ID, which may include addresses of the endpoints k and i for streaming data. In addition, at 345, the server bridge 305 may provide the stream ID to the processing function in the Cloud 320.

Once the source 301 receives the stream ID, the source 301 may, at 350, begin publishing data to the endpoint k at location k. With the received data, the endpoint k may, at 355, forward the data for the stream ID to the processing function in the Cloud 320. In addition, after receiving the stream ID, the source 301 may, at 360, publish data to the endpoint i at location i. With the received data, the endpoint i may, at 365, forward the data for the stream ID to the processing function in the Cloud 320.

Figure 4:
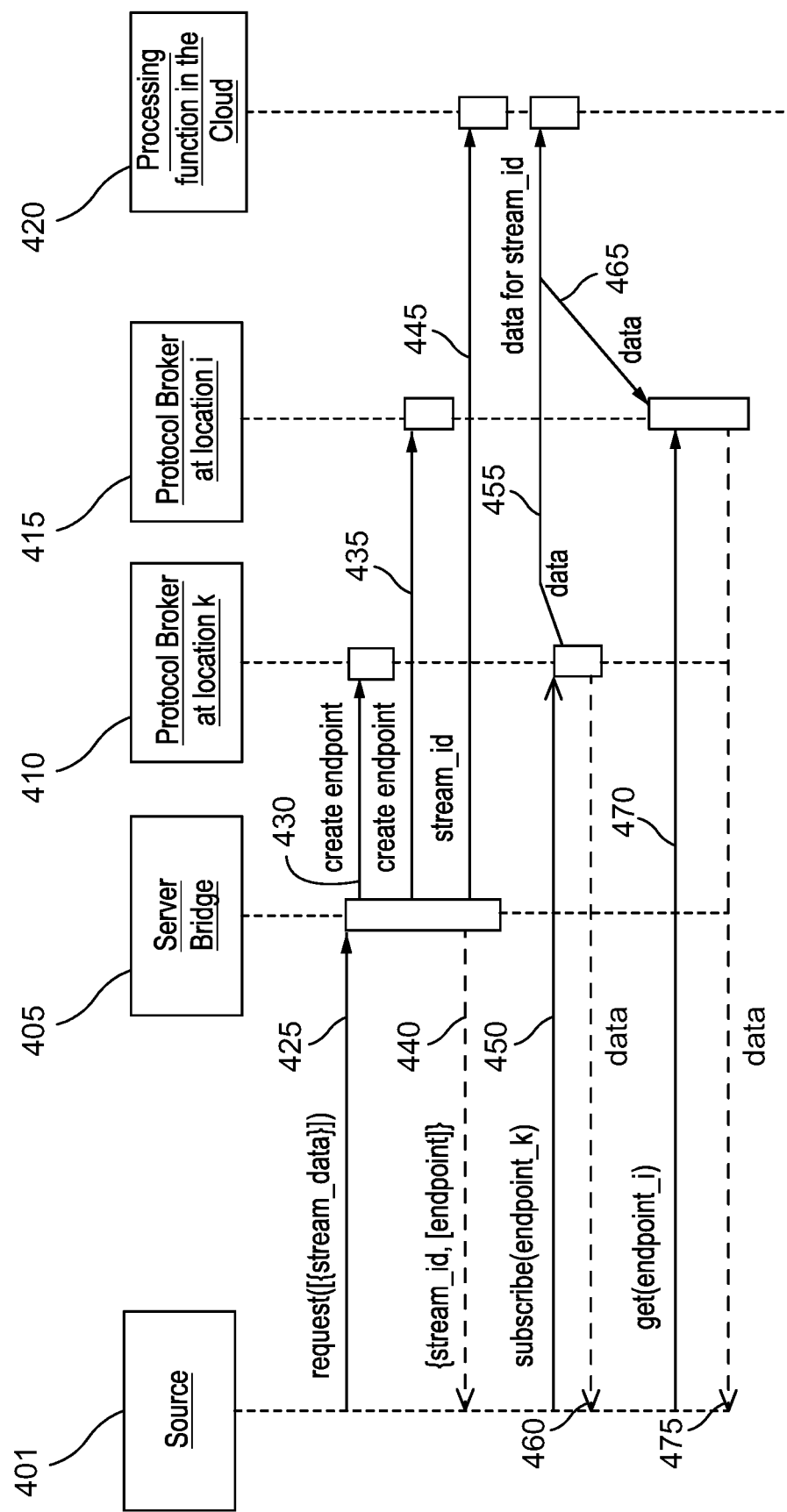
FIG. 4 illustrates another signal flow diagram according to an example embodiment.

FIG. 4 illustrates another signal flow diagram according to an example embodiment. In particular, the example signal flow diagram illustrated in FIG. 4 may relate to a downstream registration and endpoint creation procedure corresponding to a sink stream. That is, as previously described, the sink stream may consume data generated by the processing functions in the Cloud through the endpoints. Further, the example signal flow diagram illustrated in FIG. 4 may include a sink 401, server bridge 405, protocol broker 410 at location k, protocol broker 415 at location i, and a processing function in the Cloud 420. In an example embodiment, the sink 401 may be a data source or a UE, and the protocol brokers 410 and 415 may act as proxies between two communication nodes such as the sink 401 and the processing function in the Cloud 420. Further, the communication may be direct and/or indirect and push and/or pull, respectively. As illustrated in FIG. 4, the protocol brokers 410 and 415 may also be locations where endpoints are created.

In a downstream registration and endpoint creation procedure, at 425, the sink 401 may send a request to the server bridge 405 for streaming data. After the request is received and in response to the request from the sink 401, at 430, the server bridge may create an endpoint k at location k where protocol broker 410 is located. The server bridge 405, at 435, may also create an endpoint i at location i where protocol 415 is located. After the endpoints have been created, the server bridge 405 may, at 440, provide the sink 401 with a stream ID, which may include corresponding addresses of each of the endpoints k and i for streaming data. In addition, at 445, the server bridge 405 may provide the stream ID to the processing function in the Cloud 420.

Once the sink 401 receives the stream ID, the sink 401 may, at 450, subscribe to the endpoint k at location. At 455, the processing function in the Cloud 420 may provide the data associated with the stream ID for streaming to the endpoint k, and at 460, the endpoint k may stream the data to the sink 401. Further, at 465, the processing function in the Cloud 420 may provide the data associated with the stream ID for streaming to the endpoint i. With the stream ID, at 470, the sink 401 may send a get request for data to the endpoint i. After receiving the get request from the sink 401 and the data from the processing function in the Cloud 420, the endpoint i may, at 475, stream the data to the sink 401.

According to an example embodiment, protocol implementation and protocol broker may be scaled under changing load. For example, scaling may be done in a scenario in which the data rate starts to exceed the current protocol implementation deployment that handles a large group of endpoints. In such a case, a monitor may be used to track the load. When it is determined that the load is excessive, the monitor may trigger re-evaluation of the cost function, which may lead to a new, scaled deployment of protocol implementations, and protocol brokers or endpoints. In addition, existing UEs may be informed about the potentially migrated endpoints via the server bridge change stream when it is determined that the data rate is starting to exceed the current protocol implementation deployment.

FIG. 5 illustrates sample transport protocols with corresponding endpoint parameters according to an example embodiment. In certain example embodiments, the created endpoints may include protocol-specific parameters for data ingress and egress, and data may be transferred at multiple endpoints over different and/or the same protocols. As illustrated in FIG. 5, such protocols may include, but not limited to, an advanced message queuing protocol (AMQP), hypertext transfer protocol (HTTP) representational state transfer (REST), Kafka protocol, web real-time communications (WebRTC) protocol, and real-time messaging protocol (RTMP). As further illustrated in FIG. 5, the protocols may each have their corresponding endpoint parameters, which may include, for example, certain URLs and operations. In addition, such protocols may be implemented with any of the procedures described herein and illustrated in the figures.

FIG. 6(A) illustrates a list of stream data according to an example embodiment, and FIG. 6(B) illustrates a continuation of the list of stream data in FIG. 6(A) according to an example embodiment. In particular, the list stream data illustrated in FIGS. 6(A) and 6(B) show the stream data for a registration request that may, in certain example embodiments, be a request such as any of the registration requests previously described in association with FIGS. 2-4 above.

FIG. 7 illustrates another list of stream data according to an example embodiment. In particular, FIG. 7 illustrates a list of a sample sensor stream, which shows one stream example for a source stream over an HTTP protocol. In this example embodiment, UEs may publish data by using the endpoint address. Once registered, the source stream may become accessible to the platform and data may become available as soon as the actual data reaches the endpoints. In addition, according to certain example embodiments, the endpoints may be provided and managed by the platform at the stream registration phase.

FIG. 8 illustrates a further list stream of data according to an example embodiment. In particular, FIG. 8 illustrates a sample response from a stream registry according to an example embodiment. As illustrated in FIG. 8, the source can publish the data to the endpoint address (e.g., ENDPOINT_IP:PORT), and the data may become available to the functions in the Cloud.

Figure 9:
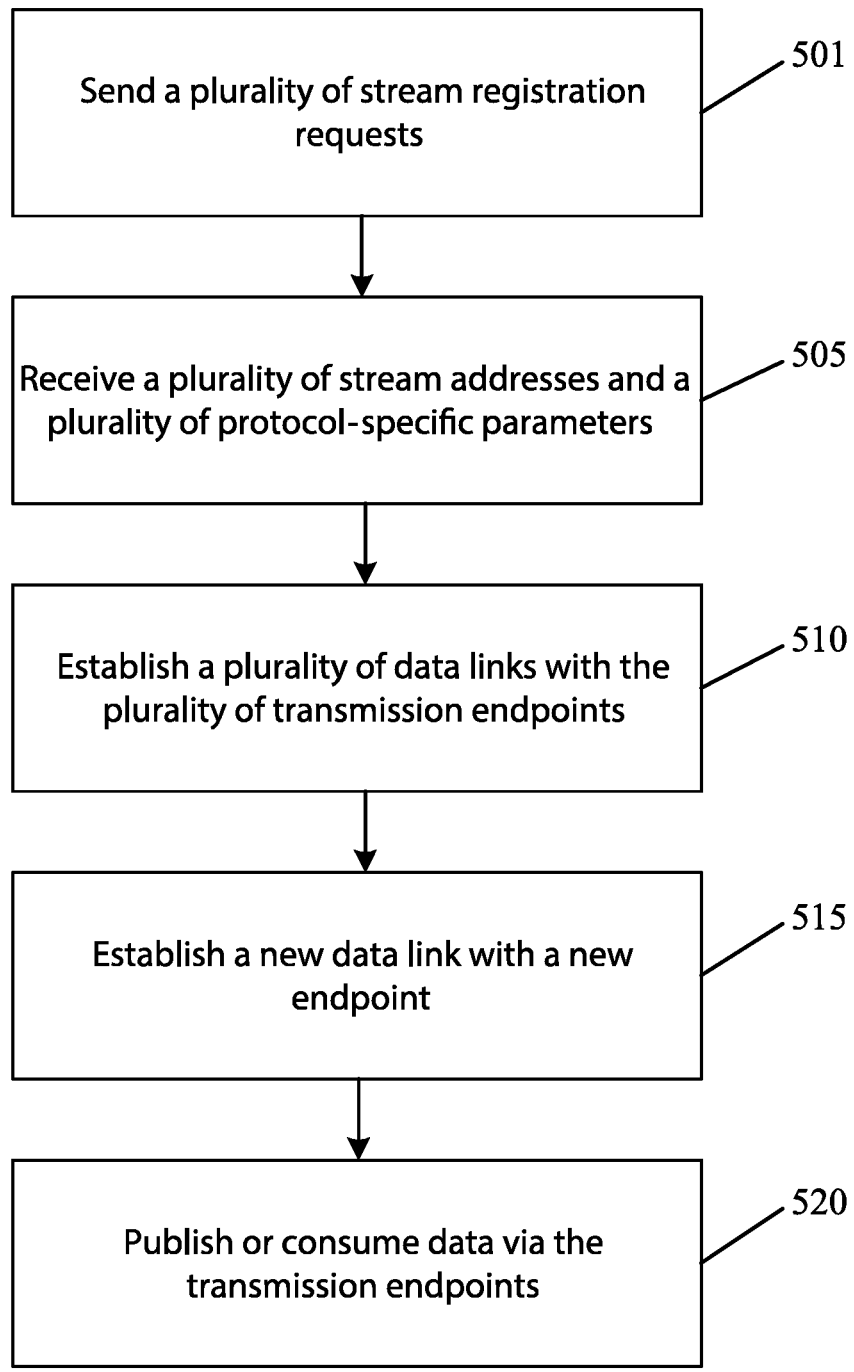
FIG. 9 illustrates a flow diagram of a method according to an example embodiment.

FIG. 9 illustrates a flow diagram of a method according to an example embodiment. In particular, FIG. 9 illustrates an example of a method that may be performed by the UE or data source, such as an IoT device. The UE described in FIG. 9 may be similar to the devices and sensors illustrated in FIG. 1, the UE described in FIG. 2, the source 301 shown in FIG. 3, or the sink 401 shown in FIG. 4. At 501, a UE may send, to a server, a plurality of stream registration requests for streams to stream data. In an example embodiment, the UE may send the requests when a user of the UE desires to publish or consume data. In addition, the requests may indicate a preferred protocol to publish or to consume data to or from a cloud platform. The requests may also include other requirements such as QoS and latency requirements.

At 505, the UE may receive, from the server, a plurality of stream addresses for a plurality of transmission endpoints, and receive a plurality of protocol-specific parameters for the plurality of transmission endpoints. At 510, the UE may, with the plurality of stream addresses, establish a plurality of data links with the plurality of transmission endpoints.

At 515, the UE may establish a new data link with a new transmission endpoint according to changing conditions affecting the UE, while preserving the same data streams for streaming the data. In certain example embodiments, each of the plurality of transmission endpoints may have the same or different protocols for concurrent data ingress and egress, and different transmission endpoints may be provided for the same data streams. In other example embodiments, the changing conditions may be based on various factors including, but not limited to a cost function that takes into account locations of the UE, both for upstream and downstream cases, and take into account the network's topology. At 520, once the data links have been established with the endpoints, the UE may publish or consume the data via the transmission endpoints.

In an example embodiment, the streams may include a source stream type or a sink stream type. According to another example embodiment, the protocols of the endpoints may include AMPQ, HTTP (REST), Kafka, WebRTC, or RTMP. In another example embodiment, the conditions affecting the user equipment and the endpoint configuration may include changes in a location of the user equipment and changes in network topology. In a further example embodiment, each of the plurality of transmission parameters may include the same protocol-specific parameters, or each of the plurality of transmission endpoints comprises different protocol-specific parameters. According to another example embodiment, the plurality of stream registration requests may include a quality of service requirement or a latency requirement.

Figure 10:
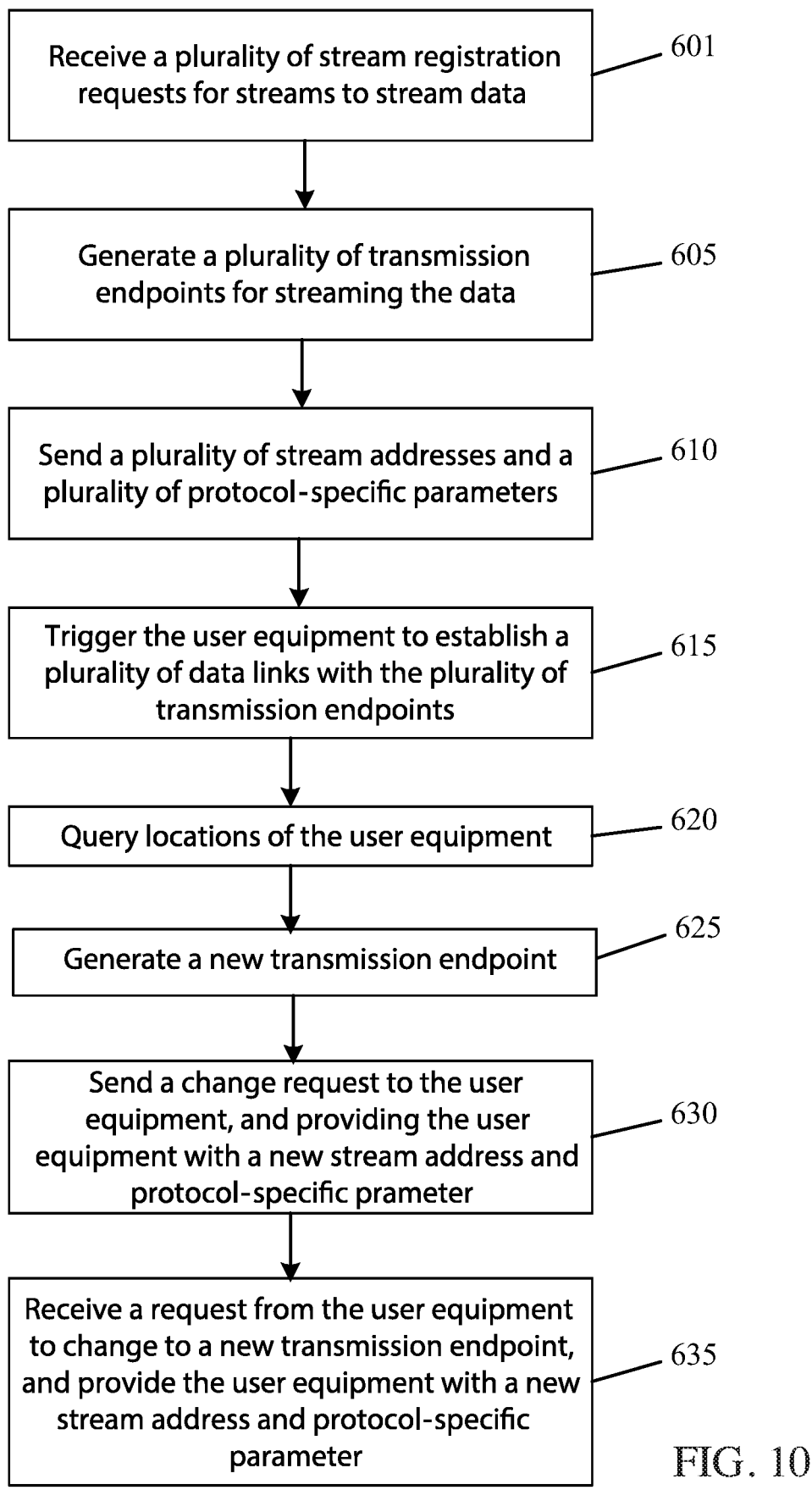
FIG. 10 illustrates another flow diagram of another method according to an example embodiment.

FIG. 10 illustrates another flow diagram of another method according to an example embodiment. In particular, FIG. 10 illustrates an example of a method that may be performed by a server bridge. The server bridge described in FIG. 10 may be similar to the server bridge described in FIG. 2, the server bridge shown in FIG. 3, or the server bridge 405 shown in FIG. 4. In 601, a server bridge may receive, from the UE, a plurality of stream registration requests for streams to stream data. According to an example embodiment, the requests may indicate a preferred protocol to publish or to consume data to or from a cloud platform. The requests may also include other requirements such as QoS and latency requirements.

At 605, the server bridge may, in response to the plurality of stream registration requests, generate a plurality of transmission endpoints for streaming the data. Further, at 610, after the plurality of transmission endpoints have been generated, the server bridge may send a plurality of stream addresses of the plurality of transmission endpoints, and send a plurality of protocol-specific parameters for the plurality of transmission endpoints. In addition, at 615, the server bridge may trigger the user equipment to establish a plurality of data links with the plurality of transmission endpoints according to the plurality of stream address and the plurality of protocol-specific parameters. In an example embodiment, the same data streams may be implemented for streaming the data through different transmission endpoints. Further, each of the plurality of the plurality of transmission endpoints may have the same or different protocols for concurrent data ingress and egress, and different transmission endpoints may be provided for the same data streams.

Further, at 620, the server bridge may query locations of the UE. At 625, the server bridge may generate a new transmission endpoint according to changing conditions affecting the UE and the transmission endpoints, while preserving the same data streams for streaming the data. In addition, at 630, the server bridge may send a change request to the UE instructing the UE to change to a new transmission endpoint, and provide the UE with a new stream address and a new protocol-specific parameter for the new transmission endpoint. Further, at 635, the server bridge may receive a request from the UE to change to a new transmission endpoint, and provide the UE with a new stream address and a new protocol-specific parameter for the new transmission endpoint.

In an example embodiment, the protocols may include AMPQ, HTTP (REST), Kafka, WebRTC, or RTMP. According to another example embodiment, the streams may include a source stream type or a sink stream type.

FIG. 11 illustrates a system according to an example embodiment. It should be understood that each signal or block in FIGS. 1-10 may be implemented by various means or their combinations, such as hardware, software, firmware, one or more processors and/or circuitry. In one example, a system may include several devices, such, as for example, UE 710 and network entity 720. The system may include more than one UE 710 and more than one network entity 720. Network entity 720 may be a network node, a base station, an access point, an access node, a gNB, an enhanced NodeB (eNB), a server, a host, or any other network entity or network core entity that may communicate with the UE 710.

Each of these devices may include at least one processor or control unit or module, respectively indicated as 711 and 721. At least one memory may be provided in each device, and indicated as 712 and 722, respectively. The memory may include computer program instructions or computer code contained therein. One or more transceiver 713 and 723 may be provided, and each device may also include an antenna, respectively illustrated as 714 and 724. Although only one antenna each is shown, many antennas and multiple antenna elements may be provided to each of the devices. Other configurations of these devices, for example, may be provided. for example, UE 710 and network entity 720 may be additionally configured for wired communication, in addition to wireless communication, and in such a case antennas 714 and 724 may illustrate any form of communication hardware, without being limited to merely an antenna.

Transceivers 713 and 723 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. one possible use is to make a network entity deliver local content. One or more functionalities may also be implemented as virtual application(s) in software that can run on a server.

A user device or UE 710 may be a mobile station (MS) such as a mobile phone or smart phone or multimedia device, an IoT device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other examples, the UE may be replaced with a machine communication device that does not require any human interaction, such as a sensor, meter, or robot. In some examples, the UE may be an industrial IoT, such as a crane, container, or any other industrial machine.

In some examples, an apparatus, such as a user equipment or a network entity, may include means for carrying out example embodiments described above in relation to FIGS. 1-10. In certain examples, at least one memory including computer program code can be configured to, with the at least one processor, cause the apparatus at least to perform any of the processes described herein.

Processors 711 and 721 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 712 and 722 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as UE 710 or network entity 720, to perform any of the processes described above (see, for example, FIGS. 1-10). Therefore, in certain examples, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain examples may be performed entirely in hardware.

In some examples, an apparatus may include circuitry configured to perform any of the processes or functions illustrated in FIGS. 1-10. Circuitry, in one example, may be hardware-only circuit implementations, such as analog and/or digital circuitry. Circuitry, in another example, may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

According to certain example embodiments, UE 710 may be controlled by memory 712 and processor 711 to perform the functions associated with the example embodiments described herein. For instance, in one embodiment, UE 710 may be controlled by memory 712 and processor 711 to send, to a server, a plurality of stream registration requests for streams to stream data. UE 710 may also be controlled by memory 712 and processor 711 to receive, from the server, a plurality of stream addresses for a plurality of transmission endpoints, and a plurality of protocol-parameters for the plurality of transmission endpoints. In addition, UE 710 may be controlled by memory 712 and processor 711 to, with the plurality of stream addresses, establish a plurality of data links with the plurality of transmission endpoints. Further, UE 710 may be controlled by memory 712 and processor 712 to establish a new data link with a new transmission endpoint according to changing conditions affecting a user equipment and the transmission endpoints, while preserving the same data streams for streaming the data.

According to other example embodiments, network entity 720 may be controlled by memory 722 and processor 721 to receive, from a user equipment, a plurality of stream registration requests for streams to stream data. Network entity 720 may also be controlled by memory 722 and processor 721 to, in response to the plurality of stream registration requests, generate a plurality of transmission endpoints for streaming the data. In addition, network entity 720 may be controlled by memory 722 and processor 721 to, after the plurality of transmission endpoints are generated, send a plurality of stream addresses and a plurality of protocol-specific parameters for the plurality of transmission endpoints. Further, network entity 720 may be controlled by memory 722 and processor 721 to trigger the user equipment to establish a plurality of data links with the plurality of transmission endpoints according to the plurality of stream addresses and the plurality of protocol-specific parameters. In addition, network entity 720 may be controlled by memory 722 and processor 721 to generate a new transmission endpoint according to changing conditions affecting the user equipment and the transmission endpoints, while preserving the same data streams for streaming the data.

Certain example embodiments described herein may provide significant technical advantages and improvements to the functioning of a network and/or to the functioning of the network entities within the network, or the user equipment communicating with the network. For example, in certain example embodiments, the separation of protocol implementation and deployment versus the generic server (stream) bridge application program interface (API) allows for extensibility and specialization of protocols. Further, multimedia streams may require and support synchronized multiplexing of different elementary streams including, for example, audio, video, and text/object overlay. This synchronization need may need to be maintained during protocol transformation. As such, specialized functions such as demuxers/muxers including queues, may be deployed in the edge cloud when a new protocol adaptation is requested.

According to other example embodiments, it may be possible to add existing real-time media protocol such as real-time transfer protocol (RTP) and RTP control protocol (RTCP) to the server bridge or sever end component. Such protocols may cater to automatic synchronization and adaptation control between endpoints and UEs. In other example embodiments, it may be possible to broaden the server bridge from the endpoint/UE communication to all communication between (media) processing functions that are each running in different clouds or domain realms. Moreover, additional protocol adaptions of stream encapsulations (e.g., encryption) may be added to the various protocol transformations.

In further example embodiments, it may be possible for the server bridge to manage a bit pool of protocol adaptors, which may be seen as small dataflow applications. For example, when multiple dataflows show overlap in data streams or data transformations (operators), they may be fused and start reusing each other's partial streams. The fusing and reusing of partial streams may therefore result in lowering the overall deployment size.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., UE 710 or apparatus 720), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that certain embodiments discussed above may be practiced with steps in a different order, and/or with hardware elements in configurations which are different from those which are disclosed. Therefore, it would be apparent to those of skill in the art that certain modifications, variations, and alternative constructions would be apparent, while remaining within the spirit and scope of the invention.

PARTIAL GLOSSARY

3GPP 3rd Generation Partnership Project
5G 5th Generation Mobile Network
AMQP Advanced Message Queuing Protocol
API Application Program Interface
eNB Enhanced NodeB
gNB 5G or NR Node
HTTP Hypertext Transfer Protocol
HTTP (REST) HTTP (Representational State Transfer)
ID Identifier
IoT Internet of Things
IP Internet Protocol
IT Information Technology
MEC Mobile Edge Computing
NR New Radio
QoS Quality of Service
RTMP Real-Time Messaging Protocol
RTP Real-Time Transfer Protocol
RTCP RTP Control Protocol
UE User Equipment
URI Uniform Resource Identifier
URL Uniform Resource Locator
WebRTC Web Real-Time Communications

What is claimed is:

1. A method, comprising:
   sending, to a server bridge, a plurality of stream registration requests for streams to stream data, wherein each of the plurality of stream registration requests comprises an indication of a preferred protocol to publish or to consume data;
   receiving, from the server bridge, a plurality of stream addresses for a plurality of transmission endpoints, and a plurality of protocol-parameters for the plurality of transmission endpoints;
   establishing, a plurality of data links with the plurality of transmission endpoints with the plurality of stream addresses;
   establishing overlapping data flows using fused data streams with the plurality of transmission endpoints over different protocols via the plurality of data links managed by a bit pool of protocol adaptors deployed on the server bridge;
   creating a stream identifier to identify one or more data streams for streaming data to a user equipment and binding the stream identifier with multiple transmission endpoints;
   establishing a new data link with a new transmission endpoint by partially reusing preserving the same data streams that were established with the plurality of transmission endpoints for streaming the data, wherein the new transmission endpoint supports a real-time media protocol different from the different real-time media protocols over which the data streams are established with the plurality of transmission endpoints; and
   performing an evaluation of changing conditions affecting the user equipment and the transmission endpoints, wherein the evaluation is triggered based on a load of the streams to enable automatic synchronization and adaptation control between transmission endpoints and user equipments.

2. The method according to claim 1, further comprising, after establishing the plurality of data links with the plurality of transmission endpoints, publishing or consuming data via the transmission endpoints.

3. The method according to claim 2, wherein the conditions affecting the user equipment and a transmission endpoint configuration comprise changes in a location of the user equipment and changes in network topology.

4. The method according to claim 1, wherein each of the plurality of transmission endpoints comprises the same protocol-specific parameters, or each of the plurality of transmission endpoints comprises different protocol-specific parameters.

5. The method according to claim 3, wherein the plurality of stream registration requests comprises a quality of service requirement or a latency requirement.

6. The method according to claim 5, wherein the streams comprise a source stream type or a sink stream type.

7. A method, comprising:
receiving, from a plurality of user equipments, a plurality of stream registration requests for streams to stream data, wherein each of the plurality of stream registration requests comprises an indication of a preferred protocol to publish or to consume data;
in response to the plurality of stream registration requests, generating a plurality of transmission endpoints for streaming the data;
sending a plurality of stream addresses and a plurality of protocol-specific parameters for the plurality of transmission endpoints;
triggering the plurality of user equipments to establish a plurality of data links, and overlapping data flows using fused data streams with the plurality of transmission endpoints over different protocols via the data links according to the plurality of stream addresses and the plurality of protocol-specific parameters managed by a bit pool of protocol adaptors deployed on a server bridge;
creating a stream identifier to identify one or more data streams for streaming data to the user equipment and binding the stream identifier with multiple transmission endpoints;
generating a new transmission endpoint by partially reusing the same data streams that were established with the plurality of transmission endpoints for streaming the data, wherein the new transmission endpoint supports a real-time media protocol different from the different real-time media protocols over which the data streams are established with the plurality of transmission endpoints; and
triggering the plurality of user equipments to perform an evaluation a of changing conditions affecting the user equipments and the transmission endpoints, wherein the evaluation is triggered based on a load of the streams to enable automatic synchronization and adaptation control between the transmission endpoints and the user equipments.

8. The method according to claim 7, further comprising:
registering the plurality of stream registration requests; and
querying locations of the plurality of user equipments.

9. The method according to claim 8, further comprising:
sending a change request to at least one of the plurality of user equipments to change to the new transmission endpoint; and
providing at least one of the plurality of user equipments with a new stream address and a new protocol-specific parameter for the new transmission endpoint.

10. The method according to claim 7, further comprising:
receiving a request from at least one of the plurality of user equipments to change to the new transmission endpoint; and
providing at least one of the plurality of user equipments with a new stream address and a new protocol-specific parameter for the new transmission endpoint.

11. The method according to claim 9, wherein the streams comprise a source stream type or a sink stream type.

12. An apparatus, comprising:
at least one processor; and
at least one memory comprising computer program code, the at least one memory and the computer program code are configured, with the at least one processor to cause the apparatus at least to
send, to a server bridge, a plurality of stream registration requests for streams to stream data, wherein each of the plurality of stream registration requests comprises an indication of a preferred protocol to publish or to consume data;
receive, from the server bridge, a plurality of stream addresses for a plurality of transmission endpoints, and a plurality of protocol-parameters for the plurality of transmission endpoints;
establish a plurality of data links with the plurality of transmission endpoints with the plurality of stream addresses;
establish overlapping data flows using fused data streams with the plurality of transmission endpoints over different protocols via the plurality of data links managed by a bit pool of protocol adaptors deployed on the server bridge;
establish a new data link with a new transmission endpoint by partially reusing the same data streams that were established with the plurality of transmission endpoints for streaming the data, wherein the new transmission endpoint supports a real-time media protocol different from the different real-time media protocols over which the data streams are established with the plurality of transmission endpoints; and
perform an evaluation of changing conditions affecting the apparatus and the transmission endpoints, wherein the evaluation is triggered based on a load of the streams to enable automatic synchronization and adaptation control between the transmission endpoints and the apparatus.

13. The apparatus according to claim 12, wherein the at least one memory and the computer program code are further configured, with the at least one processor to cause the apparatus at least to, after establishing the plurality of data links with the plurality of transmission endpoints, publishing or consuming data via the transmission endpoints.

14. The apparatus according to claim 13, wherein the conditions affecting the apparatus and a transmission endpoint configuration comprise changes in a location of apparatus and changes in network topology.

15. The apparatus according to claim 12, wherein each of the plurality of transmission endpoints comprises the same protocol-specific parameters, or each of the plurality of transmission endpoints comprises different protocol-specific parameters.

16. The apparatus according to claim 14, wherein the plurality of stream registration requests comprises a quality of service requirement or a latency requirement.

17. The apparatus according to claim 16, wherein the streams comprise a source stream type or a sink stream type.

18. An apparatus, comprising:
at least one processor; and
at least one memory comprising computer program code, the at least one memory and the computer program code are configured, with the at least one processor to cause the apparatus at least to
receive, from a plurality of user equipments, a plurality of stream registration requests for streams to stream data, wherein each of the plurality of stream registration requests comprises an indication of a preferred protocol to publish or to consume data;

in response to the plurality of stream registration requests, generate a plurality of transmission endpoints for streaming the data;

send a plurality of stream addresses and a plurality of protocol-specific parameters for the plurality of transmission endpoints;

trigger the user equipment to establish a plurality of data links, and overlapping data flows using fused data streams with the plurality of transmission endpoints over different protocols via the data links according to the plurality of stream addresses and the plurality of protocol-specific parameters managed by a bit pool of protocol adaptors deployed on the apparatus;

create a stream identifier to identify one or more data streams for streaming data to the user equipment and binding the stream identifier with multiple transmission endpoints;

generate a new transmission endpoint by partially reusing the same data streams that were established with the plurality of transmission endpoints for streaming the data, wherein the new transmission endpoint supports a real-time media protocol different from the different real-time media protocols over which the data streams are established with the plurality of transmission endpoints; and trigger the plurality of user equipments to perform an evaluation of changing conditions affecting the user equipment and the transmission endpoints, wherein the evaluation is triggered based on a load of the streams to enable automatic synchronization and adaptation control between the transmission endpoints and the user equipments.

19. The apparatus according to claim 18, wherein the at least one memory and the computer program code are further configured, with the at least one processor to cause the apparatus at least to:

register the plurality of stream registration requests; and query locations of the plurality of user equipments.

20. The apparatus according to claim 19, wherein the at least one memory and the computer program code are further configured, with the at least one processor to cause the apparatus at least to:

send a change request to at least one of the plurality of user equipments to change to the new transmission endpoint; and provide at least one of the plurality of user equipments with a new stream address and a new protocol-specific parameter for the new transmission endpoint.

21. The apparatus according to claim 18, wherein the at least one memory and the computer program code are further configured, with the at least one processor to cause the apparatus at least to:

receive a request from at least one of the plurality of user equipments to change to the new transmission endpoint; and provide at least one of the plurality of user equipments with a new stream address and a new protocol-specific parameter for the new transmission endpoint.

22. The apparatus according to claim 20, wherein the streams comprise a source stream type or a sink stream type.

* * * * *